Sept. 29, 1959 R. D. KEHLER ET AL 2,906,958

IMPROVED APPARATUS FOR MEASURING PUNCH-THROUGH VOLTAGE OR A RELATED QUANTITY

Filed Aug. 21, 1957

INVENTORS
RUSSELL D. KEHLER
ALVIN R. TOPFER
BY
Herbert Epstein
AGENT 2,906,958

IMPROVED APPARATUS FOR MEASURING PUNCHTHROUGH VOLTAGE OR A RELATED QUANTITY

Russell D. Kehler, Norristown, and Alvin R. Topfer, Ambler, Pa., assignors to Philco Corporation, Philadelphia, Pa., a corporation of Pennsylvania Application August 21, 1957, Serial No. 679,336

18 Claims. (Cl. 324—158)

Figure 1:
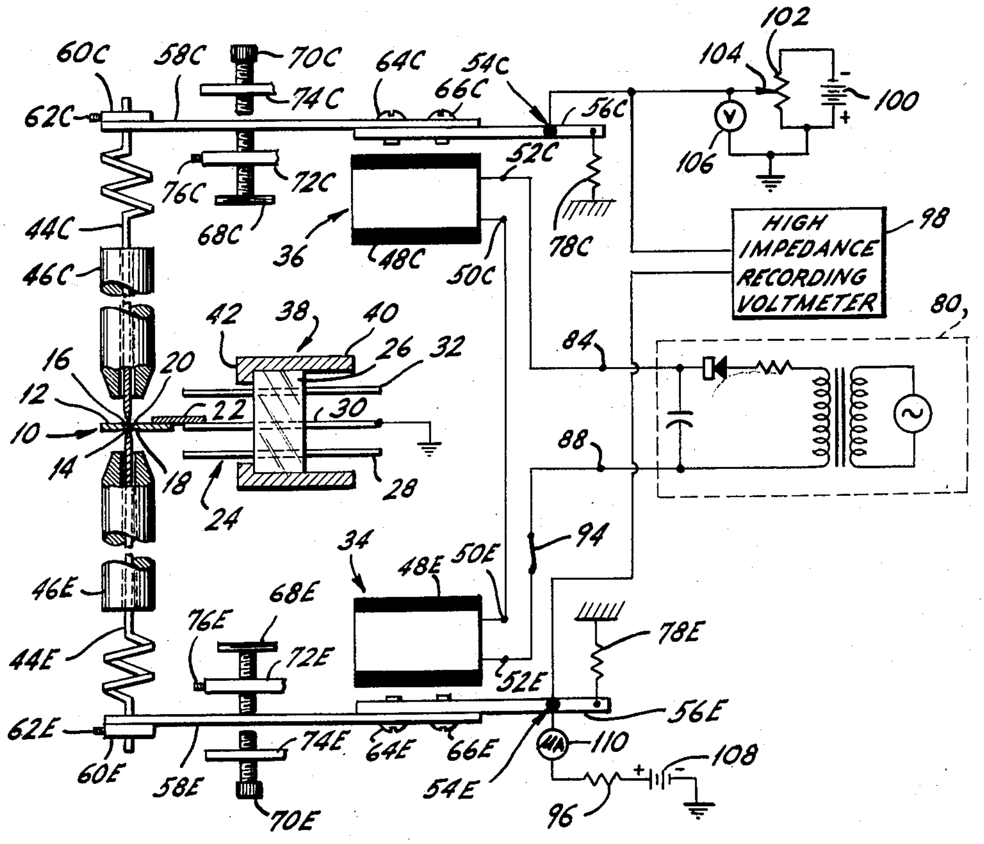

This invention relates to electrical apparatus and more particularly to improved apparatus for measuring the punchthrough voltage of a transistor.

In order that a transistor may amplify efficiently high-frequency alternating currents, it is necessary that the transistor have a small base width, typically of the order of 0.00007 to 0.00014 inch, so that the transit time of injected minority carriers traveling from the emitter element to the collector element of the transistor shall be small. However, a transistor having such a small base width generally has also a small punchthrough voltage. The latter voltage is the smallest value of back-biasing voltage which, when applied between the collector and base (or emitter and base) elements of the transistor, produces within its base element a space-charge region extending between the collector and emitter elements. The condition wherein the aforementioned space-charge region extends entirely across the base element, between the emitter and collector elements, is termed punchthrough.

During the time that the transistor is in a punched-through condition, it does not operate in its normal minority-carrier diffusion mode but instead operates with such greatly altered impedance and amplification characteristics that it becomes unsuited for or inoperative in circuits designed for transistors functioning in their conventional manner. Because, in conventional transistor circuits, the collector element is generally operated with a back-biasing voltage applied thereto, the punchthrough voltage is an important parameter limiting the maximum collector voltage which may be applied to the transistor consistent with the normal transistor mode of operation.

Because punchthrough voltage varies directly as the square of the base width of the transistor, it was thought at first that successive transistors having substantially the same punchthrough voltage could be produced merely by forming base regions of substantially equal width in successive semiconductive bodies having approximately the same density of significant impurities. However, the punchthrough voltage of a transistor is proportional not only to the square of the base width, but also to the respective reciprocals of the bulk resistivity of the semiconductive material and the mobility of minority carriers therewithin, and the values of the latter two quantities may vary substantially even for extremely small differences in the crystalline structure of different lots of the semiconductive material. As a result, even where the base widths of successive transistors are maintained within extremely close tolerances, the value of their punchthrough voltages may nevertheless vary over a substantial range of values due to unavoidable variations in the nature of the crystalline material. Since in many applications it is essential that the punchthrough voltage be substantially equal to a fixed predetermined value, it has heretofore been necessary in production frequently to discard a substantial number of the transistors so fabricated because their punchthrough voltages fell outside the narrow tolerance limits permissible for this parameter. The costliness of such a procedure will be apparent.

To avoid this undesirable loss of time and materials and the high costs resulting therefrom, it has proved desirable in certain instances to control the thicknesses of the bases of successive transistors so as to produce units having substantially the desired punchthrough voltage. For example, one method for producing this result in the manufacture of surface-barrier transistors is to record or otherwise detect the values of the punchthrough voltages of successive transistors and to adjust periodically, either automatically or manually, the thickness to which the etching apparatus machines the semiconductive wafers, so as to compensate for systematic deviations of the successive punchthrough voltages from the desired value.

To achieve this end in an assembly line arrangement for mass-producing transistors, it is necessary that punchthrough voltage-measuring apparatus be provided which may be manipulated facilely by a relatively unskilled operator and which will provide readings which are direct, unambiguous, and accurate and easily recordable by a recording voltmeter. In addition it is desirable that the apparatus be simple in construction so as to be relatively immune from failure, as well as inexpensive. Heretofore, however, no apparatus possessing these desirable attributes has been available. Instead, and as an example, a typical prior-art apparatus for measuring the punchthrough voltage of a transistor comprises a sweep generator which is connected to apply between the collector and base of the transistor a reverse-biasing voltage, the value of which is periodically swept through a range of values including the punchthrough voltage. Such apparatus additionally comprises a cathode-ray oscilloscope the horizontal and vertical deflection circuit of which have high input impedances. The horizontal deflection circuit of the oscilloscope is connected between the collector and base of the transistor, while the vertical deflection circuit thereof is connected between the emitter and base of the transistor, it being considered essential by the prior-art that the emitter-base circuit be maintained substantially open-circuited. Under these conditions a trace is produced upon the screen of the oscilloscope, which trace is substantially horizontal until the sweep voltage applied between collector and base elements attains the punchthrough voltage; the oscilloscopic trace then deviates from the horizontal substantially linearly as the sweep voltage continues to exceed the punchthrough voltage by greater and greater amounts. Accordingly, the point at which the trace deviates from the horizontal indicates the punchthrough voltage of the transistor.

This apparatus, while indeed providing a measure of the punchthrough voltage, suffers from several disadvantages. First, it is expensive. Specifically it includes an expensive cathode-ray oscilloscope which must have high input impedances particularly in the vertical deflection circuit. In addition it includes a sweep generator, which may be expensive. Moreover the horizontal scale of the oscilloscope must be accurately calibrated in order to be usable for this measurement. In this regard, unless an oscilloscope having a large-diameter screen is employed, it is difficult to calibrate and read voltages thereon with good precision. Furthermore, even where a large-screen oscilloscope is used, the position of the break in the displayed characteristic, indicative of the punchthrough voltage, is frequently somewhat rounded and hence ambiguous, and as a result the precision of the measurement is often insufficiently good for use in commercial production. In addition the oscillographic display is not convenient for making a permanent record of the measurements of the punchthrough voltages of successive units, and hence may not be convenient for use in indicating any systematic trends in the punchthrough voltages of these successive units.

Accordingly it is an object of our invention to provide apparatus for measuring accurately a quantity related to the punchthrough voltage of a transistor connected thereto.

Another object is to provide apparatus which produces a direct and accurate reading of the punchthrough voltage of a transistor connected thereto.

A further object is to provide punchthrough-voltage measuring apparatus which requires no expensive oscilloscopes or sweep generating circuits.

A still further object is to provide punchthrough-voltage measuring apparatus which may be used successfully by technically unskilled operators working on an assembly line.

Yet another object is to provide punchthrough-voltage measuring apparatus whose output may be supplied readily to a recording voltmeter, so that readings of the punchthrough voltage of successive transistors may conveniently be inscribed on a single record.

An additional object is to provide punchthrough-voltage measuring apparatus which is readily adapted to incorporation in a mechanized assembly line for the mass production of transistors.

All of the foregoing objects of our invention are achieved through the provision of novel apparatus for measuring a quantity related to the punchthrough voltage of a transistor which comprises a body of semiconductive material and first and second rectifying elements positioned on said body. This apparatus includes means for applying, between the first rectifying element and the semiconductive body, a back-biasing voltage having a magnitude exceeding the punchthrough voltage of the transistor. It further includes resistive means for supplying to the second rectifying element a potential having a value lying in a range bounded by and including the potential of the semiconductive body and a second potential of polarity such as to forward-bias the second rectifying element. Finally, to display the magnitude of the quantity dependent on the punchthrough voltage, voltage-measuring means are provided, one terminal of which is connected to the second rectifying element and the other terminal of which is supplied by appropriate means with a potential related in known manner to that of the first rectifying element.

In certain preferred embodiments the resistive means comprises a resistor and a voltage source connected in series relationship between the second rectifying element and the semiconductive body, the voltage source being poled so as to forward-bias the second rectifying element, while in other preferred embodiments this means comprises merely the resistor connected between the second element and the body. Moreover, where it is desired accurately to measure the actual value of the punchthrough voltage as contrasted with a quantity related but not equal thereto, said other terminal of the voltage-measuring means is connected directly to the first rectifying element of the transistor. Where instead it is desired to measure a voltage which is related to though not equal to the punchthrough voltage of the transistor, e.g. where it is desired to measure the deviation of the punchthrough voltage of the transistor from a predetermined value, said other terminal of the voltage-measuring means is supplied with a voltage differing by a predetermined amount from the voltage applied to the first rectifying element.

In all of the preferred forms of the apparatus of our invention, the voltage-measuring means has an impedance substantially exceeding the resistance of the resistive means as well as the impedance of the semiconductive body between the first and second rectifying elements, and takes the specific form of a recording voltmeter. By utilizing a recording voltmeter, an accurate record of the punchthrough voltages of successively tested transistors is obtained. Accordingly, as discussed above, the operator of the assembly line by examination of this record can immediately detect undue deviations in the punchthrough voltages of the successive transistors coming off the line and adjust appropriately the base-width determining apparatus to compensate for these deviations. In practice this technique has reduced to an almost insignificant figure the number of transitsors found unacceptable because of punchthrough voltages lying outside of the permitted range.

Figure 2:
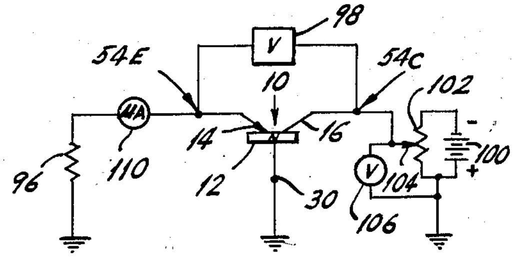
Figure 3:
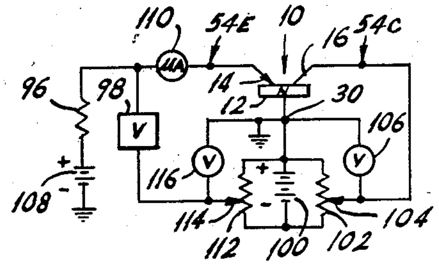

Other advantages and features of the invention will become apparent from a consideration of the following detailed description, taken in connection with the accompanying drawings, in which:

Figure 1 is an illustration, partly diagrammatic and partly in section, of a preferred form of the apparatus according to our invention; and Figures 2 and 3 are diagrammatic representations of two aditional forms of our novel apparatus.

Turning first to Figure 1 there is shown schematically a punchthrough-voltage measuring apparatus embodying our invention. This embodiment is described specifically with regard to its use in measuring the punchthrough voltages of surface-barrier transistors. However it is to be understood that it can also be used to measure the punchthrough voltages of many other types of transistors.

Thus Figure 1 depicts a partly fabricated surface-barrier transistor 10, the punchthrough voltage of which is to be ascertained. This transistor comprises a wafer 12 of n-type germanium which typically may have a bulk resistivity of approximately 0.8 ohm-centimeter, a minority-carrier lifetime exceeding 50 microseconds, a length and width of 0.10 inch and 0.05 inch respectively, and a thickness over most of its area of about 0.003 inch. Transistor 10 additionally includes emitter and collector electrodes 14 and 16 respectively, which may be composed of indium and are positioned in coaxial depressions 18 and 20 respectively. Typically the thickness of the semiconductive material remaining between the opposing depressions is 0.00012 inch. Transistor 10 further comprises a nickel base tab 22 secured to wafer 12 by means providing a substantially ohmic contact therewith, e.g. by a solder constituted primarily of tin. In addition transistor 10 includes a mounting structure 24 which comprises a cylindrical glass stem 26 in which are embedded three nickel-plated copper steam leads 28, 30 and 32 respectively, positioned in parallel coplanar relationship to the axis of the stem. Wafer 12 is electrically connected to the centrally-positioned stem lead 30 of structure 24 by welding of the base tab 22 to lead 30. The peripheral stem leads 28 and 32 are, at a later stage in the transistor fabrication process, electrically connected respectively to emitter electrode 14 and collector electrode 16 by wire leads (not shown).

To measure the punchthrough voltage of transistor 10 it is necessary to make low-resistance electrical contacts respectively with emitter electrode 14 and collector electrode 16 thereof. Moreover, in order that the punchthrough-voltage measuring apparatus may be useful in an assembly-line for mass-producing transistors at high speed, it is necessary that an unskilled worker be able to both make and break rapidly these low-resistance electrical contacts without damaging the transistor. It will be understood that the transistor is in fact very easily damaged because, as aforementioned, the thickness of semiof the transistors being manufactured has a punchthrough trodes is frequently less than one ten-thousandth of an inch and is readily fractured by any impact or force of appreciable magnitude. Thus, to avoid fracturing the fragile transistor body, electrical contact to the emitter and collector electrodes must be made in a manner such that only the minimum amount of mechanical impact and force needed to assure a low-resistance connection is applied.

A contacting apparatus fulfilling all of these stringent requirements is shown in Figure 1. It is also described and claimed in allowed copending patent application Serial No. 679,815 filed August 23, 1957, by Salvatore Santamaria and Alvin R. Topfer, entitled "Mechanical Apparaus," and assigned to the assignee of the present application, now Patent No. 2,872,645. This apparatus comprises an emitter-contacting subassembly 34, a collector-contacting subassembly 36, and a transistor-positioning jig 38 all fixedly positioned with respect to each other. The emitter-contacting and collector-contacting subassemblies 34 and 36 respectively, are of substantially identical structure, so that a detailed description of only one of these subassemblies is required.

As shown in the drawing, transistor-positioning jig 38 may comprise a cylindrical metal shell, shown in section at 40, which over the greater part of its length has an inside diameter substantially equal to the outside diameter of the glass stem 26 of transistor 10, and has at one end 42 thereof a smaller inside diameter which is slightly greater than the distance between the peripheral stem leads 28 and 32, respectively. When the punchthrough voltage of a partially assembled transistor such as transistor 10 is to be measured, the partially assembled transistor is inserted within jig 38 in a manner such that the germanium wafer 12 extends through the aperture in end 42, and the surface of glass stem 26 adjacent wafer 12 abuts this end.

The emitter-contacting subassembly 34, which affords a precisely-positioned and low-resistance electrical contact to emitter 14 of transistor 10 with a minimum of impact and force comprises a contacting probe 44E which is sharply pointed at one end, i.e. the end which is to contact emitter 14, and is coiled into a spiral spring at the other end. Typically, probe 44E may be fabricated from stainless steel or tungsten.

To guide the point of probe 44E accurately to emitter electrode 14 of transistor 10 when the latter is positioned within jig 38 as shown, a glass tubing 46E is provided whose bore is only slightly larger than the diameter of probe 44E. Tubing 46E is fixedly positioned with respect to jig 38 in a manner such that the longitudinal axis of its bore is substantially perpendicular to the surfaces of wafer 12 and passes substantially through the center of emitter electrode 14.

To force the point of probe 44E against emitter electrode 14 after transistor 10 has been positioned properly within jig 38, and subsequently to disconnect probe 44E from emitter 14 after the punchthrough voltage has been measured, a relay-like electromagnetic actuating apparatus is provided. This apparatus comprises a coil 48E having terminals 50E and 52E respectively and fixedly positioned with respect to tubing 46E, and a pair of pivots one of which is shown at 54E, and about which an armature 56E, fabricated of a highly permeable metal such as soft iron, is constrained to swing. It additionally includes a probe holder 58E which may be fabricated from stainless steel and comprises a fitting 60E containing a hole of a diameter just exceeding the diameter of probe 44E and which accommodates a setscrew 62E to secure probe 44E to probe holder 58E. The apparatus further comprises iron screws 64E and 66E respectively which serve to fasten probe holder 58E to armature 56E, and limit screws 68E and 70E respectively which are threaded into brackets 72E and 74E respectively and serve to establish the limits of arcuate travel of armature 56E and probe holder 58E about pivot 54E. Brackets 72E and 74E are positioned fixedly with respect to pivot 54E and coil 48E, and bracket 72E has a setscrew 76E threaded thereinto by which limit screw 68E can be immobilized. Lastly, the apparatus comprises a tension spring 78E, one end of which is secured to armature 56E and the other end of which is secured to a point fixed with respect to pivot 54E. Spring 78E serves to urge probe holder 58E against the end of limit screw 70E when coil 48E is unenergized.

As aforementioned, because the base width of transistor 10 is so small, the base region of the transistor is easily damaged by mechanical impacts and forces of any substantial magnitude. Accordingly, to minimize such impacts and forces, setscrew 68E is established at a position such that, when coil 48E is energized, thereby urging armature 56E against setscrew 68E, the point of probe 44E moves just sufficiently to make a low-resistance contact with emitter electrode 14. Moreover, the spring portion of probe 44E serves to absorb a substantial portion of the shock of impact, thereby lessening still further the danger of damaging the transistor. In addition setscrew 70E, which determines the distance by which armature 56E is separated from coil 48E when the latter coil is unenergized, is set at a position such that when coil 48E is unenergized probe 44E is retracted sufficiently far away from emitter 14 so that transistor 10 may be easily inserted into or removed from jig 38 without touching probe 44E, but not so far away that probe 44E can have imparted thereto sufficient momentum to injure transistor 10 when coil 48E is energized.

The collector-contacting subassembly 36 includes a relay-type electromagnetic actuating apparatus which is substantially identical in structure to the just-described actuating apparatus of emitter-contacting subassembly 34. Accordingly, components of the collector-contacting subassembly corresponding to those of the emitter-contacting subassembly are designated by the same numerals, suffixed by the letter "C." Because the functions of the components of collector-contacting assembly 36 are identical to the functions of their counterparts in emitter-contacting subassembly 34, no further discussion thereof is believed necessary herein.

To energize coils 48E and 48C of emitter-contacting and collector-contacting subassemblies 34 and 36 respectively, a D.C. power supply 80 of conventional form is provided having output terminals 84 and 88 respectively. Output terminal 84 is connected directly to terminal 52C of coil 48C, while output terminal 88 is connected to terminal 52E of coil 48E, via a single-pole single-throw control switch 94. To complete the coil-energizing circuit, terminal 50C of coil 48C is directly connected to terminal 50E of coil 48E. By thus connecting coils 48C and 48E in series relationship, the electromagnetic contacting system is conditioned to fail safe in the sense that, if either coil 48C or 48E becomes open-circuited, neither coil can be energized and therefore neither probe 44C nor 44E can be urged singly against the contiguous electrode of transistor 10. Normally however, when switch 94 is closed, coils 48C and 48E are energized simultaneously and armatures 56C and 56E are urged respectively against limit screws 68C and 68E. As a result probes 44C and 44E are urged respectively against collector electrode 16 and emitter electrode 14 of transistor 10. When switch 94 is opened, coils 48C and 48E are simultaneously de-energized, and tension springs 78C and 78E urge probes 44C and 44E, respectively, away from the collector and emitter electrodes 16 and 14 of transistor 10 and against limit screws 70C and 70E respectively. This action, by disengaging probes 44C and 44E from transistor 10, enables free insertion and removal of the transistor from jig 38.

In accordance with the invention, to enable an accurate and direct-reading measurement of the punchthrough voltage of transistor 10 to be made, there is provided apparatus which applies between collector electrode 16 and body 12 of transistor 10 a back-biasing voltage the magnitude of which substantially exceeds the punchthrough voltage of transistor 10. In addition apparatus is provided which applies between emitter electrode 14 and body 10, via a resistor 96 of substantial value, a small forward-biasing potential. Importantly, to display the value of the punchthrough voltage, which under these biasing conditions appears between emitter electrode 14 and collector electrode 16, a voltmeter 98 is connected between collector 16 and emitter 14. Preferably voltmeter 98 has an impedance substantially higher, e.g. ten or more times higher, than the value of resistor 96, as well as the resistance under punchthrough conditions of semiconductive body 12 between emitter electrode 14 and collector electrode 16, so that the current flowing between the emitter and collector electrodes is not appreciably diverted by voltmeter 98.

More particularly, and in the specific arrangement shown in Figure 1, the aforementioned back-biasing voltage exceeding the punchthrough voltage of transistor 10 is applied between collector electrode 16 and wafer 12 (which as shown is connected to a point at reference potential via stem lead 30) by a source which comprises a battery 100 shunted by a potentiometer 102 having a movable contact 104. Battery 100 has its positive pole connected to a point at the same reference potential as semiconductive wafer 12, while potentiometer 102 has its variable contact 104 connected to probe 44C of collector-contacting subassembly 36, via pivot 54C, armature 56C, and probe holder 58C. To display the magnitude of the back-biasing voltage applied between collector electrode 16 and wafer 12 of transistor 10, a voltmeter 106 is connected between movable contact 104 and a point at reference potential.

To supply a forward-biasing current to emitter electrode 12 of transistor 10, a second battery 108 is provided, the negative pole of which is connected directly to a point at reference potential and the positive pole of which is connected to probe 44E via resistor 96, a microammeter 110, pivot 54E, armature 56E, and probe holder 58E. Preferably resistor 96 has a relatively high value, e.g. of the order of 1 to 5 megohms.

Importantly, to obtain a permanent record of the value of the punchthrough voltage of transistor 10 as well as that of succeeding transistors to be tested, voltmeter 98 is preferably a recording voltmeter and is connected directly between pivots 54C and 54E, thereby affording direct connection to the collector and emitter electrodes 16 and 14 respectively of transistor 10 via armatures 56C and 56E, probe holders 58C and 58E and contacting probes 44C and 44E respectively.

In a typical instance, wherein body 12 of transistor 10 is constituted of monocrystalline n-type germanium having a bulk resistivity of the order of 0.8 ohm-centimeter and a base width of the order of 0.00012 inch, transistor 10 has a punchthrough voltage of about 10 volts. For measuring the punchthrough voltage of such a transistor, the components and applied voltages and currents may have the following values:

| | |
|---|---|
| Battery **100** | 22.5 volts. |
| Potentiometer **102** | 25,000 ohms. |
| Voltmeter **106** | 0 to 25 volt scale. |
| Battery **108** | 1.5 volts. |
| Resistor **96** | 2.2 megohms. |
| Microammeter **110** | 0–3 microampere scale. |
| Voltmeter **98** | 0–25 volt scale, 60 megohms input resistance. |
| Collector-to-base voltage | 20 volts. |
| Emitter current | About 1 microampere. |

It is of course to be understood that these values are merely exemplary and are in no way intended to limit the scope of our invention.

Under these conditions, whenever probes 44E and 44C contact emitter and collector electrodes 14 and 16 respectively, the high-impedance recording voltmeter 98 indicates and records with high accuracy the punchthrough voltage of transistor 10 under test, without resort to the oscilloscopes and sweep generators required by the prior art. As a result, the apparatus of Figure 1 lends itself to use in a simple, straightforward method which may readily be practiced by an unskilled operator on an assembly line to measure the punchthrough voltages of a succession of transistors.

In this regard, a typical assembly-line operation of the arrangement of Figure 1 is as follows. Initially, switch 94 is opened, thereby de-energizing coils 48C and 48E and causing probes 44C and 44E to be retracted within glass tubing 46C and 48E by the operation of springs 78C and 78E. Next, partially-completed transistor 12 is inserted within jig 38, and electrical connection is made between stem lead 30 and a point at reference potential. Then control switch 94 is closed, thereby energizing coils 48C and 48E. This action causes probes 44E and 44C to be urged gently into low-resistance electrical contact with emitter and collector electrodes 14 and 16 respectively. As a result the operating voltages respectively supplied to these probes are applied to the contacted electrodes. Consequently the punchthrough voltage of the transistor is accurately displayed and recorded by high-impedance recording voltmeter 98. Thereafter switch 94 is again opened; transistor 10 is removed from jig 38; a new transistor is inserted therein, and the operation is repeated. By observing the magnitudes and their trend of the successively measured punchthrough voltages, as recorded by high-impedance voltmeter 98, the operator can determine rapidly whether each of the transistors being manufactured has a punchthrough voltage within the permitted range and whether the punchthrough voltages of successive units are undesirably trending toward a value outside of the permitted range. If such a trend in fact exists, the operator can then readily compensate for it by varying in the appropriate sense the thickness to which the semiconductive bodies of subsequent transistors are etched.

By utilizing such a technique, it has been found possible to obtain, for example, a 90 percent yield of transistors having punchthrough voltages within 1.5 volts of the desired value of 8.5 volts, whereas when the same type of transistor was fabricated without this punchthrough-measuring step but with the same tolerance requirement, the yield was only 60 percent. From these contrasting yields, the great commercial usefulness of our novel apparatus is readily apparent.

The punchthrough voltage-measuring apparatus of Figure 1 is only one of a variety of circuits which accord with our invention. For example, two additional arrangements of our novel apparatus are shown in Figures 2 and 3 of the drawings. In the latter figures, emitter and collector contacting subassemblies 34 and 36 respectively, power supply 80 for coils 48C and 48E and transistor positioning jig 38, all depicted in Figure 1, have been omitted for simplicity, and only the schematic diagrams of the punchthrough-voltage measuring circuits of our invention are shown. However these contacting subassemblies are preferably also used in combination with the novel measuring circuitry of each of Figures 2 and 3 to provide the necessary connections to the elements of the transistor to be tested. Accordingly the appropriate reference characters of Figure 1 have been used to designate the points at which the components of the circuits of Figures 2 and 3 are respectively connected to emitter-contacting probe 44E, collector-contacting probe 44C and stem lead 30 of Figure 1.

Turning now specifically to the arrangement of Figure 2, it is seen that the latter arrangement differs from that of Figure 1 in only two respects, namely, battery 108, connected in the emitter circuits of Figure 1, has been removed, and the terminal of resistor 96, connected in Figure 1 to the positive pole of battery 108, is connected in the arrangement of Figure 2 directly to a point at reference potential. In this regard, we have found that, as in the case of the embodiment of Figure 1, so long as resistor 96 has a value substantially smaller than the input resistance of recording voltmeter 98, preferably one-tenth or less than this input resistance, voltmeter 98 indicates directly and accurately the punchthrough voltage of transistor 10.

Figure 3 illustrates a third embodiment of our invention which is particularly useful where the quantity to be measured is functionally related, though not necessarily equal, to the punchthrough voltage of the transistor. Such a quantity may be, for example, the deviation of the punchthrough voltage of the transistor from a predetermined voltage. In the arrangement shown in Figure 3, the structure for supplying a reverse-biasing voltage exceeding the punchthrough voltage to the collector electrode 16, and the structure for supplying a forward-biasing current to emitter electrode 14 are respectively identical to the corresponding structures of Figure 1. However the apparatus of Figure 3 additionally comprises a second potentiometer 112 which has a movable contact 114 and is shunted across battery 100. Movable contact 114 is connected in series relationship with recording voltmeter 98, whose other terminal is connected to the junction of microammeter 110 and resistor 96, as in the preceding embodiments. To measure the value of the voltage applied to recording voltmeter 98 by potentiometer 112, a voltmeter 116 is connected between movable arm 114 and semi-conductive body 12.

In operation, the position of movable contact 114 may be adjusted, with the aid of voltmeter 116, so that its potential equals the potential of collector electrode 16. Under these conditions, the potentials applied to voltmeter 98 are the same as those applied in the arrangement of Figure 1, and the actual punchthrough voltage is again indicated by voltmeter 98. However by changing the position of movable contact 114 from the above-mentioned position, the potential applied to voltmeter 98 can be changed by a known amount from the potential of collector electrode 16. Such a change causes recording voltmeter 98 to indicate a voltage differing from the punchthrough voltage by this known amount. Accordingly where it is desired to measure the deviation of the punchthrough voltage of the transistor being tested from a predetermined optimum value, it is only necessary to adjust movable contact 114 of potentiometer 112 so that its potential is less than the collector potential by an amount equal to said predetermined value.

While each of the three circuits described above is specifically adapted to measure the punchthrough voltages of transistors having n-type semiconductive bodies, our novel apparatus is by no means limited to measuring the punchthrough voltages of only these types of transistors. On the contrary our apparatus may be instantly adapted for measuring the punchthrough voltage of transistors having p-type semiconductive bodies merely by reversing the polarity of each battery and meter appearing in the apparatus. Moreover while in the specific example, the transistor was described as having a germanium body, this body can obviously be fabricated of silicon or any other suitable semiconductive material.

Furthermore, while the transistor whose punchthrough voltage is to be measured is specifically described in the foregoing discussion as being a surface-barrier transistor, it is to be understood that our apparatus is also capable of measuring the punchthrough voltages of other forms of transistors, e.g. alloy-junction and grown-junction transistors, which comprise, as emitter and collector elements, first and second rectifying junctions positioned on opposing surfaces of a semiconductive body.

Moreover, while voltmeter 98 has been illustrated in each example as a recording voltmeter, it obviously need not be a recording voltmeter but instead may be a pointer-indicating voltmeter or a voltmeter using any other form of indication which is convenient in the specific applications for which our apparatus is to be used. In addition, while in the preferred embodiments the reverse-biasing voltage applied between the collector electrode and semiconductive body has a substantially constant value, it is not essential that this voltage be constant. For example, the reverse-biasing voltage may take the form of unidirectional pulses having a maximum amplitude substantially exceeding the punchthrough voltage of the transistor. Such a pulsating voltage may be supplied by simple apparatus (not shown) which, for example, may comprise a source of alternating voltage having an amplitude exceeding the punchthrough voltage of the transistor to be tested, and a rectifier and a resistor connected in series relationship with each other and in shunt with this source. A suitable unidirectional voltage is then produced across the resistor. Where such a pulsating voltage is used as the collector-to-base or emitter-to-base voltage, the recording voltmeter preferably is a peak-reading instrument.

In addition, while in each of the above-described embodiments the back-biasing voltage exceeding the punchthrough voltage is applied between the collector electrode and the semiconductive body, this back-biasing voltage may alternatively be applied between the emitter electrode and the body. In such a case, the collector electrode of the transistor is, in accordance with the invention, either supplied with a small forward-biasing current by way of resistive means or is connected by these means directly to the base electrode of the transistor. In such an arrangement, the recording voltmeter may be connected directly between the emitter and collector electrodes, as shown in Figures 1 and 2, or may be connected in series relationship with the collector electrode and a source of voltage having a magnitude related in known manner to that applied to the emitter electrode, in the manner of Figure 3.

While we have described our invention by means of specific examples and in specific embodiments, we do not wish to be limited thereto, for obvious modifications will occur to those skilled in the art without departing from the scope of our invention.

What we claim is:

1. Apparatus for measuring the punchthrough voltage of a transistor which comprises a body of semiconductive material and first and second rectifying elements positioned on said body, said apparatus comprising means for applying between said first rectifying element and said semiconductive body a back-biasing voltage having a magnitude exceeding said punchthrough voltage of said transistor; means including a series-connected resistor for connecting said second rectifying element to said semiconductive body; and means for measuring the potential difference between said first and second rectifying elements, said last-named means having an impedance substantially higher than the impedance of said body between said first and second rectifying elements and also substantially higher than the resistance of said series-connected resistor.

2. Apparatus for measuring the punchthrough voltage of a transistor which comprises a body of semiconductive material and first and second rectifying elements positioned on said body, said apparatus comprising means for applying between said first rectifying element and said body a back-biasing voltage having a magnitude exceeding said punchthrough voltage; resistive means for applying between said second rectifying element and said body a forward-biasing voltage; and means for measuring the difference in the respective potentials of said first and second rectifying elements.

3. Apparatus for measuring the punchthrough voltage of a transistor which comprises a base element and emitter and collector elements located on said base element, said apparatus comprising means for applying between said collector and base elements a back-biasing voltage having a substantially constant magnitude exceeding said punchthrough voltage; a resistor; means for connecting one terminal of said resistor to said emitter electrode; means applying between said base element and another terminal of said resistor a forward-biasing voltage of substantially constant magnitude; means for measuring potential differences, said last-named means having a resistance substantially higher than the resistance of said resistor and also substantially higher than the resistance under punchthrough conditions of said body between said emitter and collector elements; and means for connecting said potential-difference measuring means directly between said emitter and collector elements.

4. Apparatus according to claim 3 wherein said resistance of said potential-difference measuring means is at least ten times higher than said resistance of said resistor and is also at least ten times higher than said resistance between said emitter and collector elements.

5. Apparatus for measuring the punchthrough voltage of a transistor which comprises a body of semiconductive material and first and second rectifying elements positioned on said body, said apparatus comprising means for applying between said first rectifying element and said body a back-biasing voltage having a magnitude exceeding said punchthrough voltage; resistive means; means for connecting said resistive means directly between said second rectifying element and said body; and means for measuring the difference in the respective potentials of said first and second rectifying elements.

6. Apparatus for measuring the punchthrough voltage of a transistor of the type which comprises a base element and emitter and collector elements located on said base element, said apparatus comprising means for applying between said collector and base elements a back-biasing voltage having a substantially constant magnitude exceeding said punchthrough voltage; a resistor; means for connecting said resistor directly between said emitter and base elements; potential-difference-measuring means having a resistance substantially higher than the resistance of said resistor and also substantially higher than the resistance under punchthrough conditions of said base element between said emitter and collector elements; and means for connecting said potential-difference measuring means directly between said emitter and collector elements.

7. Apparatus according to claim 6, wherein said resistance of said potential-difference-measuring means is at least ten times higher than said resistance of said resistor and is also at least ten times higher than said resistance of said base element between said emitter and collector elements.

8. Apparatus for measuring a quantity related to the punchthrough voltage of a transistor which comprises a body of semiconductive material and first and second rectifying elements positioned on said body, said apparatus comprising means for applying between said first rectifying element and said body a back-biasing voltage having a magnitude exceeding said punchthrough voltage; a resistor; means for connecting one terminal of said resistor to said second rectifying element; means for supplying to another terminal of said resistor a voltage having a polarity such as to forward-bias said second rectifying element; means for measuring potential differences; means for connecting one terminal of said potential-difference-measuring means to said second rectifying element; a source of direct-current voltage differing from said back-biasing voltage by a substantially constant amount lying in a range including the amount zero; means for connecting one terminal of said source to said body of said transistor; and means for connecting another terminal of said source to the other terminal of said potential-difference-measuring means.

9. Apparatus for measuring the deviation from a predetermined value of the punchthrough voltage of a transistor which comprises a base element and emitter and collector elements located on said base element, said apparatus comprising means for applying between said collector and base elements a substantially constant, back-biasing voltage having a magnitude exceeding said punchthrough voltage; a resistor; means for connecting one terminal of said resistor to said emitter element; means for applying between said base element and another terminal of said resistor a substantially constant forward-biasing voltage; means for measuring potential differences, said last-named means having a resistance substantially higher than the resistance of said resistor; a source of a direct voltage having a substantially constant magnitude substantially equal to the difference between said magnitude of said back-biasing voltage and said predetermined value; and means for connecting said potential-difference measuring means and said voltage source in series relationship between said base and emitter elements, said source being poled in a sense tending to back-bias said emitter element.

10. The apparatus of claim 9, wherein said resistance of said voltmeter is at least ten times higher than said resistance of said resistor.

11. Apparatus for measuring the punchthrough voltage of a transistor which comprises a base element and emitter and collector elements located on said base element, said apparatus comprising means for applying between said collector and base elements a back-biasing voltage having a substantially constant magnitude exceeding said punchthrough voltage; a resistor; means for connecting one terminal of said resistor to said emitter element; means for applying between said base element and another terminal of said resistor a forward-biasing voltage having a substantially constant magnitude; a voltmeter having a resistance substantially higher than the resistance of said resistor; a source of a direct-current voltage having a substantially constant magnitude substantially equal to said magnitude of said back-biasing voltage; and means for connecting said voltmeter and said source of said direct-current voltage in series relationship between said base and emitter elements, said source being poled in a sense tending to back-bias said emitter element.

12. The apparatus of claim 11, wherein said resistance of said voltmeter is at least ten times higher than said resistance of said resistor.

13. Apparatus for measuring a quantity related to the punchthrough voltage of a transistor of the type which comprises a body of semiconductive material and first and second rectifying elements positioned on opposing surfaces of said body, said apparatus comprising: means for connecting said body to a point at reference potential; first and second conductive probes; first means controllable to urge said first probe into abutting relationship with said first rectifying element and also to retract said first probe from contact with said first element; second means controllable to urge said second probe into abutting relationship with said second rectifying element and also to retract said second probe from contact with said second element; means for applying between said first probe and a point at reference potential, a voltage having a magnitude exceeding said punchthrough voltage and a polarity such as to back-bias said first rectifying element when said first probe is in contact therewith; resistive means for supplying to said second probe a potential having a value lying in the range bounded by and including the potential of said body and a second potential having a value such as to forward-bias said second element when said second probe is in contact therewith; means for measuring potential differences; means for connecting one terminal of said potential-difference-measuring means to said second probe; and means for supplying to another terminal of said potential-difference-measuring means a potential related in known manner to that of said first probe.

14. Apparatus according to claim 13, wherein said means for supplying said voltage to said other terminal of said potential-difference-measuring means comprises means for connecting said other terminal of said potential-difference-measuring means to said first conductive probe.

15. Apparatus according to claim 14, wherein said resistive means comprises a resistor and a source of voltage connected in series relationship between a point at reference potential and said second probe, said voltage source being poled in a sense such as to forward-bias said second rectifying element when said second probe is in contact therewith.

16. Apparatus according to claim 14, wherein said resistive means comprises a resistor connected between said second probe and a point at reference potential.

17. Apparatus according to claim 13, wherein said resistive means comprises a resistor and a first source of voltage connected in series relationship between a point at reference potential and said second probe, said voltage source being poled in a sense such as to forward-bias said second rectifying element when said second probe is in contact therewith; and said means for supplying a voltage to said other terminal of said potential-difference measuring means comprises a second source of voltage connected between said other terminal and a point at reference potential, said second source being poled in a sense tending to back-bias said second rectifying element when said second probe is in contact therewith.

18. Apparatus for measuring a quantity related to the punchthrough voltage of a transistor which comprises a body of semiconductive material and first and second rectifying elements, said apparatus comprising means for applying between said first rectifying element and said body a back-biasing voltage having a magnitude exceeding said punchthrough voltage; means including a direct-current-conductive resistive element for supplying a forward-biasing current to said second rectifying element; means for developing a particular potential differing from the potential of said first rectifying element by a substantially constant amount lying in a range including the amount zero; and means for measuring the difference between said particular potential and the potential of said second rectifying element.

References Cited in the file of this patent

"Checking D.C. Parameters of Transistors," Electronic Industries and Tele-Tech., October 1956, vol. 15, No. 10, pp. 56–58, 82, 84, 86, 89, 90.

UNITED STATES PATENT OFFICE

CERTIFICATION OF CORRECTION

Patent No. 2,906,958 September 29, 1959

Russell D. Kehler et al.

It is hereby certified that error appears in the above numbered patent requiring correction and that the said Letters Patent should read as corrected below.

Column 4, line 67, strike out "of the transistors being manufactured has a punchthrough" and insert instead -- conductive material between its emitter and collector elec- --.

Signed and sealed this 29th day of August 1961.

(SEAL)
Attest:

ERNEST W. SWIDER
Attesting Officer

DAVID L. LADD
Commissioner of Patents